ALKYL ALUMINUM SALTS OF ORGANIC ACIDS AND PREPARATION THEREOF

William K. Johnson and James C. Wygant, Dayton, Ohio, assignors to Monsanto Chemical Company, St. Louis, Mo., a corporation of Delaware
No Drawing. Filed Sept. 12, 1955, Ser. No. 533,888
12 Claims. (Cl. 260—448)

This invention relates to a process for preparing alkyl aluminum salts of organic acids.

One object of this invention is the provision of a simple method for preparing dialkyl aluminum salts of organic acids. Another object is the provision of new alkyl aluminum salts of organic acids. A further object is to provide a process for preparing primary organic acids.

According to our invention a symmetrical trialkyl aluminum compound, which may be represented by the formula: $AlR_3$, where R is a hydrocarbon radical having at least two aliphatic carbon atoms, one of said aliphatic carbon atoms being joined to the aluminum atom by direct carbon to aluminum linkage, is treated with $CO_2$ whereby a compound having the formula:

is formed. The radical R is in all cases an alkyl radical. However, it may contain other substituents; for example, those of an aromatic nature; for example, a phenyl radical may be substituted on the alkyl radical provided that the aryl radical is joined to an aliphatic carbon atom and not to the aluminum compound.

According to a further aspect of the invention the compound

which is initially formed may be hydrolyzed. Upon hydrolysis of this compound a hydrocarbon having the structure RH and an organic acid having the structure RCOOH are formed. The hydrolysis reaction is effected by treating the compound:

with water or aqueous solutions at ordinary temperatures or with steam at elevated temperatures followed by acidification. The temperature at which hydrolysis is carried out is not critical and, accordingly, any convenient temperature may be employed.

The several hydrolysis products are separated from the aluminum hydrate and from each other by any convenient method. In the usual case the organic components will be separated from the aluminum hydrate by extraction with a suitable organic solvent employing filtration or decantation as a means of separation. The solution of the organic product in the solvent will contain the hydrocarbons in those cases where their respective boiling points are sufficiently high, and will also contain the organic acid liberated. Distillation may generally be resorted to in order to separate the hydrocarbon from the acids. When the hydrocarbons are of sufficiently low boiling point, reduction of pressure, together with heating of the solvent, if necessary, will serve to effect the desired separation. The organic acid may be recovered directly as the free acid, or by reacting it with suitable bases, may be recovered as a salt.

The trialkyl aluminum compounds employed in the present process may be prepared by reacting aluminum hydride with the corresponding olefin as described in German Patent No. 917,006. By this means olefins such as isobutylene may be reacted with aluminum hydride and triisobutylaluminum obtained directly. The triisobutylaluminum so obtained may be reacted by an exchange reaction with an α-olefin which is mono-substituted on the β-carbon atom, giving an aluminum trialkyl containing almost exclusively the normal alkyl chain and at the same time liberating isobutylene. An exception to this general rule, wherein normal aluminum trialkyls are formed, one of us has found to exist in the case where styrene is reacted with triisobutylaluminum. In this case mixtures of triphenethylaluminum-containing compounds are produced in which mixture compounds having the α and β carbon atoms joined to the aluminum atom are present.

The invention is further illustrated by the following examples.

Example 1

300 cc. of dry benzene was placed in a one-liter flask equipped with dropping funnel, stirrer, thermometer and reflux condenser, the latter being connected with a mercury trap. The flask was filled with dry nitrogen in order to remove air and moisture. Then 54.0 g. (0.273 mol) of triisobutylaluminum was added through the dropping funnel, the funnel replaced with a gas inlet tube and dry $CO_2$ passed into the solution. Carbonation commenced immediately as evidenced by generation of heat so that cooling was applied to the exterior of the flask in order to maintain the temperature therein at about 50° C. At times the system had a slight vacuum indicating practically complete absorption of $CO_2$.

After about 55 minutes the temperature began to fall and the $CO_2$ began to bubble through the mercury trap. The solution which was completely clear at this stage was heated to reflux and refluxed for 20 minutes while continuing the passage of $CO_2$ at a good rate. All of the added $CO_2$ appeared to be passing through the solution so that heating was thereupon discontinued.

The apparatus was next connected to a wet gas meter and the solution contained in the flask hydrolyzed by the addition thereto of 250 cc. of water. The addition of the first few drops was accompanied by much foaming and gas evolution and the separation of a gel-like precipitate. About 0.32 cu. ft. (9 l.) of gas was recovered, measured at 75° F. Then 100 cc. of concentrated HCl was added which resulted in the formation of two clear layers. The benzene layer was next separated and the water layer extracted with 25 cc. of benzene. The combined benzene solutions were dried over magnesium sulfate. The dried solution was filtered and distilled. After taking off the benzene and an intermediate fraction, there was obtained:

16.1 g.:
  Boiling point, 171–174° C.
  Pot temperature, 191–240° C.

This fraction was identified as isovaleric acid. Yield was 58% based on a carbonation product of the formula

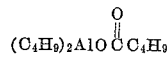

Example 2

300 cc. of dry benzene was placed in a flask equipped as described in Example 1 above and 76.5 (0.386 mol) of triisobutylaluminum added. Flushing with nitrogen gas was done as above and a stream of $CO_2$ was passed in for one hour and 40 minutes. At the end of this time the temperature began to drop; however, the flow of $CO_2$ was continued for an additional one hour and 20 minutes.

The solution obtained above was next transferred to a distillation flask provided with a column and the benzene removed employing a pot temperature of 40–50° C., first employing an aspirator and finally a vacuum oil pump in order to evacuate the flask. The final temperature was 40° C. and the pressure was 1 mm. The weight of product was 84.8 g. The product was filtered and recovered as a clear, faintly yellow, oily liquid.

A sample of the product analyzed for aluminum gave 12.39%.
Calculated for $C_{13}H_{27}AlO_2$; aluminum=11.13%.
Calculated for $C_{12}H_{27}Al$; aluminum=13.6%.
Calculated for $C_{13}H_{27}AlO_2 \cdot C_{12}H_{27}Al$;
aluminum=12.27%

*Example 3*

In this example 42.7 g. of triethylaluminum was carbonated as described above, the temperature being maintained at about 50° C. by cooling until the reaction had ceased. After completion, the solution was slightly greyish-green and somewhat turbid. After standing over night the solution was a clear, supernatant liquid over a slight greyish precipitate. The liquid was filtered.

The filtrate was distilled, the benzene being first removed through a Vigreux column, first employing a pressure of 180 mm. then a pressure of ½ mm. with a pot temperature of 50° C. The weight of the oily residue resulting was 50.5 g. The residue was filtered and a sample thereof submitted for analysis.

Found: aluminum=19.64%.
Calculated for $(C_2H_5)_2AlO_2CC_2H_5 \cdot (C_2H_5)_3Al$; aluminum=19.9%.

*Example 4*

In this example 123 g. (0.36 mol) of triphenethylaluminum was dissolved in 100 cc. of dry benzene and carbonation carried out substantially as described above. The reaction of $CO_2$ with the triphenethylaluminum was exothermic as in other cases and the cooling was accordingly applied to the exterior of the flask. By this means a temperature of the reaction mass was maintained at near 50° C. Upon completion of the reaction, the solution was deep red in color and somewhat turbid. The solution was then filtered and distilled to remove contained benzene, the temperature finally reaching 50° C. while under a high vacuum. The residue resulting was a thick red mass in the amount of 136 g. (theory: 139 g.).

A sample taken for analysis gave 6.31% aluminum.
Calculated for

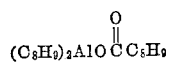

aluminum=6.98.

When R has a value less than 5 carbon atoms, there is a tendency for the first formed carbonation product to combine with a molecule of the trialkylaluminum compound to form complexes of the formula:

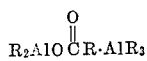

Such complexes may be hydrolyzed directly by treatment with an aqueous solution with liberation of the corresponding hydrocarbon RH and the formation of the said

In most cases, however, it will be preferable to separate the constituents of the carbonation complex by treating the same with a complexing agent for the compound $AlR_3$. Useful complexing agents are the dialkyl ethers or the alkali fluorides; e.g., potassium or sodium fluorides.

The carbonation of the trialkylaluminum compounds may be carried out in the presence or in the absence of a solvent. Usually the presence of a solvent in the reaction mass is desirable since the reaction is then somewhat easier to control. Since heat is liberated by the reaction, it will be desirable to apply cooling fluids to the reaction vessel. On the other hand, when employing solvents below say 100° C. the reaction heat may be permitted to boil the solvent and thus to carry the heat into a reflux condenser with which the reaction vessel may be equipped. Generally the temperature at which carbonation is conducted is not critical; however, it should not be permitted to rise to levels at which decomposition of the products takes place.

What we claim is:
1. The process which comprises treating with carbon dioxide a compound having the formula $AlR_3$ where R is a hydrocarbon radical containing at least two aliphatic carbon atoms selected from the group consisting of alkyl radicals and phenyl substituted alkyl radicals, one of said aliphatic carbon atoms being joined directly to the aluminum atom, and forming a compound having the formula

2. The process which comprises treating triisobutylaluminum with carbon dioxide and forming diisobutylaluminum isovalerate.
3. The process which comprises treating triphenethylaluminum with carbon dioxide and forming diphenethylaluminum phenylpropionate.
4. Compounds corresponding to the formula:

where all of the R's in any one compound are the same hydrocarbon radical and contain at least two aliphatic carbon atoms in each case and are selected from the group consisting of alkyl radicals and phenyl substituted alkyl radicals, the bond joining the hydrocarbon radical and the aluminum atom joining said aliphatic carbon thereto.
5. The compound diisobutylaluminum isovalerate.
6. The compound diphenethylaluminum phenylpropionate.
7. The complex compound diisobutylaluminum isovalerate-triisobutylaluminum.
8. The compound diethylaluminum propionate.
9. The complex compound diethylaluminum propionate-triethylaluminum.
10. The process which comprises hydrolyzing the $CO_2$ addition product of a compound having the formula $AlR_3$, where R is a hydrocarbon radical containing at least two aliphatic carbon atoms selected from the group consisting of alkyl radicals and phenyl substituted alkyl radicals, one of said aliphatic carbon atoms being joined to the aluminum atom, and recovering a carboxylic acid containing one more carbon atom than said hydrocarbon radical from said product.
11. The process which comprises hydrolyzing diisobutylaluminum valerate by treating the same with water and recovering isovaleric acid.
12. A method of preparing monocarboxylic acids which comprises reacting aluminum trialkyl wherein the alkyl radicals each contain from 2 to 5 carbon atoms with carbon dioxide for a period of time sufficient to form an aluminum salt of the desired acid, hydrolyzing the aluminum salt, forming the free acid and recovering free product acid from the mixture.

References Cited in the file of this patent

UNITED STATES PATENTS

| | | |
|---|---|---|
| 2,063,365 | Conover | Dec. 8, 1936 |
| 2,113,812 | Lippincott | Apr. 12, 1938 |
| 2,141,477 | Losch | Dec. 27, 1938 |
| 2,327,815 | Niedercorn et al. | Aug. 24, 1943 |
| 2,699,457 | Ziegler et al. | Jan. 11, 1955 |
| 2,827,458 | Mirviss et al. | Mar. 18, 1958 |